(12) United States Patent
Anderson et al.

(10) Patent No.: US 10,989,605 B2
(45) Date of Patent: Apr. 27, 2021

(54) STREAK CAMERA CALIBRATION

(71) Applicant: Arete Associates, Northridge, CA (US)

(72) Inventors: Steven P. Anderson, Fairfax, VA (US); Lucas Hill, Tucson, AZ (US)

(*) Notice: Subject to any disclaimer, the term of this patent is extended or adjusted under 35 U.S.C. 154(b) by 371 days.

(21) Appl. No.: 16/015,570

(22) Filed: Jun. 22, 2018

(65) Prior Publication Data

US 2019/0128740 A1 May 2, 2019

Related U.S. Application Data

(60) Provisional application No. 62/577,298, filed on Oct. 26, 2017.

(51) Int. Cl.
| | |
|---|---|
| *G01P 3/36* | (2006.01) |
| *G01J 11/00* | (2006.01) |
| *G01S 7/497* | (2006.01) |
| *G01S 7/486* | (2020.01) |
| *G01S 17/89* | (2020.01) |
| *G01S 17/42* | (2006.01) |

(52) U.S. Cl.
CPC ............ *G01J 11/00* (2013.01); *G01S 7/486* (2013.01); *G01S 7/497* (2013.01); *G01S 17/42* (2013.01); *G01S 17/89* (2013.01); *G01J 2011/005* (2013.01)

(58) Field of Classification Search
CPC .......... G01S 7/497; G01S 7/486; G01S 17/42; G01S 17/89; G01J 11/00; G01J 2011/005
USPC ........................................................ 356/28
See application file for complete search history.

(56) References Cited

U.S. PATENT DOCUMENTS

| | | | | |
|---|---|---|---|---|
| 4,435,727 A | * | 3/1984 | Schiller ................. | G04F 13/026 348/135 |
| 8,207,484 B1 | * | 6/2012 | Williams ............... | G01C 13/00 250/203.6 |
| 2008/0106724 A1 | * | 5/2008 | Braune ................. | G08B 13/187 356/4.02 |

OTHER PUBLICATIONS

D.S.Montgomery et al., Flat-field response and geometric distortion measurements of optical streak cameras. Lawrence Livermore National Laboratory; Livermore, CA 1987.
Damien Aubert; Geometric deformation measurement and correction applied to dynamic streak camera images; IOP Science; iopscience.iop.org; 2002.
Donaldson et al., A Self-Calibrating, Multichannel Streak Camera for Inertial Confinement Fusion Applications; 2002.
P. A. Jaanimagi et al., The streak camera development program at LLE; Laboratory for Laser Energetics, University of Rochester.

* cited by examiner

*Primary Examiner* — Mark Hellner
(74) *Attorney, Agent, or Firm* — FisherBroyles, LLP; Gregory T. Fettig; Gregory T Fettig

(57) ABSTRACT

Systems and methods presented herein provide for calibrating a streak tube. The method includes inserting fiducial light to received optical signal. The fiducial light has at least one predetermined attribute. The method also includes correcting environmental degradation of the streak tube based on the at least one predetermined attribute of the fiducial light to calibrate the streak tube.

30 Claims, 19 Drawing Sheets

STREAK CAMERA CALIBRATION

CROSS REFERENCE TO RELATED APPLICATIONS

This patent application claims priority to, and thus the benefit of an earlier filing date from, U.S. Provisional Patent Application No. 62/577,298 (filed Oct. 26, 2017), the contents of which are hereby incorporated by reference.

SUMMARY

Systems and methods presented herein provide for calibrating a streak tube. In one embodiment, a method includes inserting fiducial light to received optical signals. The fiducial light has at least one predetermined attribute. The method also includes correcting environmental degradation of the streak tube based on the at least one predetermined attribute of the fiducial light to calibrate the streak tube.

The various embodiments disclosed herein may be implemented in a variety of ways as a matter of design choice. For example, the system and method embodiments hereof may take the form of computer hardware, software, firmware, or combinations thereof. Other exemplary embodiments are described below.

BRIEF DESCRIPTION OF THE FIGURES

Some embodiments are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments. It will thus be appreciated that those skilled in the art will be able to devise various arrangements that, although not explicitly described or shown herein, embody certain principles that are included within the scope of the embodiments. Furthermore, any examples described herein are intended to aid in understanding the principles of the embodiments and are to be construed as being without limitation to such specifically recited examples and conditions. As a result, the embodiments are not limited to any specific examples described below.

Figure 1:
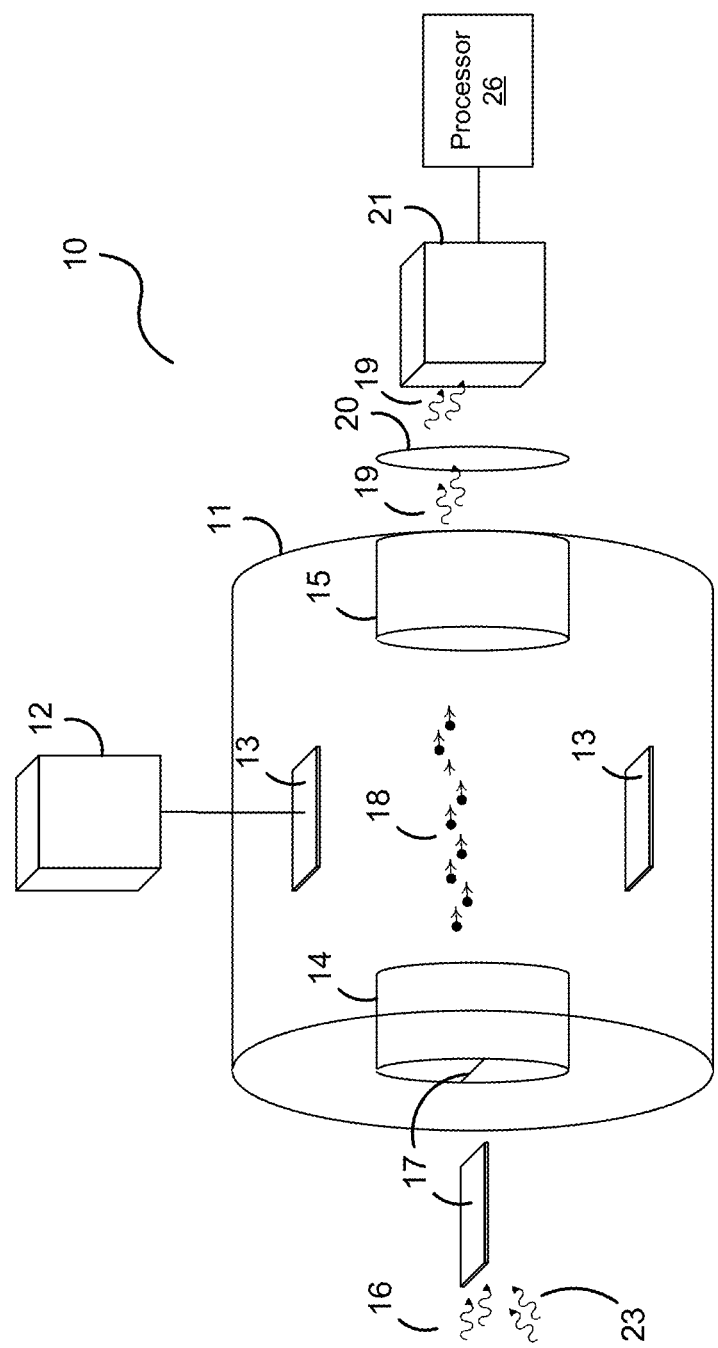
FIG. 1 is a block diagram of an exemplary streak tube system for imaging light.

FIG. 1 is a block diagram of an exemplary streak tube system 10. Streak tubes are used to map space-time variability of received optical signals (e.g., photons). The optical signal is received along a slit and mapped to a two-dimensional image. A horizontal axis of the image corresponds to a spatial position of the signal along a slit aperture and a vertical axis of the image corresponds to the time delay of the signal. The image intensity corresponds to input optical intensity of the signal.

In this embodiment, the streak tube system 10 comprises a streak tube 11 that receives optical signals 16 with a photo cathode 14. Slit aperture optics 17 couple the optical signals 16 to the photo cathode 14. And, light patterns appearing at the slit aperture optics 17 illuminate the photo cathode 14 and cause the photo cathode 14 to release electrons 18 in a pattern that matches the light pattern.

Voltages placed on accelerating electrodes 13 provide kinetic energy to the electrons 18 and direct the electrons 18 towards a phosphor screen 15, where the kinetic energy is converted into photons 19 in a horizontal spatial pattern matching the light patterns at the slit aperture optics 17. A sweep voltage circuit 12 produces a dynamic electric field across the electrodes 13 and deflects the path of the electrons 18 traversing the streak tube 11 such that a phosphor image is formed at a phosphor screen 15. The phosphor image is vertically displaced with respect to time. For example, a laser pulse received by the streak tube system 10 at one moment will be vertically displaced in the phosphor image with respect a subsequent laser pulse forming in the phosphor image.

A resultant two-dimensional (2D) spatial emission pattern at the phosphor screen 15 is digitized using imaging optical elements 20 and 21, such as a lens (e.g., imaging optical element 20) configured with a focal plane array (FPA) or an optical detector array lens (e.g., imaging optical element 21). The image, therefore, has a vertical direction corresponding to a time delay and a horizontal direction corresponding to the spatial dimension along a slit aperture of the slit aperture optics 17. The imaging optical element 20, if configured as a lens, provides a means for mapping the phosphor image to an FPA (e.g., the imaging optical element 21). However, other methods, such as tapered fiber arrays, may also be used.

The embodiments herein provide calibration of the streak tube system 10 by introducing fiducial signals 23. The fiducial signals 23 have known qualities or attributes that are operable to provide a geometric calibration mapping of specific pixels as digitized by the optical element 21 to time and spatial position of the signal along a slit aperture. For example, variations in environmental conditions (e.g., changes in the orientation of the earth's magnetic field relative to the streak tube 11, opto-mechanical distortion of the streak tube 11, thermal distortion of the streak tube 11, etc.) may be encountered during operation of the streak tube system 10. This "environmental degradation" can distort the geometric calibration mapping of the electrons 18 to the phosphor screen 15 of the streak tube 11. The embodiments herein provide a dynamic calibration that can directly/regularly measure and update the geometric maps to account for the environmental degradation during operations of the streak tube 11. In this regard, the streak tube system 10 also includes a processor 26 that is operable to correct the environmental degradation of the streak tube 11 by adjusting the image generated by imaging optical element 21 and/or any other imaging components using the fiducial signals 23.

In one embodiment, the streak tube system 11 can be configured to operate as the receiver for a light detection and ranging ("lidar", also referred to as ladar) system that delivers a laser pulse into a region to illuminate a scene. The slit aperture optics 17 image the lidar pulse return from the scene onto the photo cathode 14. The time delay of the light illuminating the photo cathode 14 is proportional to the distance to the backscattering medium and results in a vertical offset in the phosphor image formed by the phosphor screen 15.

To illustrate, a streak tube imaging lidar (STIL) system may be implemented using the streak tube system 10 to map bathymetry and topography from an airborne platform. In this embodiment, a pulsed laser beam with a fanned spatial pattern is used to illuminate a strip-region of a scene. The streak tube system 10 is aligned so that the return from the illuminated strip is imaged onto the slit aperture optics 17. The light pattern from the phosphor screen 15 is imaged onto a conventional FPA (e.g., the imaging optical element 21) for analysis. Typically, the optical image is limited to a narrow slit on the photo cathode 14 (e.g., from the slit aperture optics 17) and the scan direction is orthogonal to the slit such that the image formed at the phosphor screen 15 represents time in the vertical direction and a horizontal image position in the horizontal direction.

Figure 2:
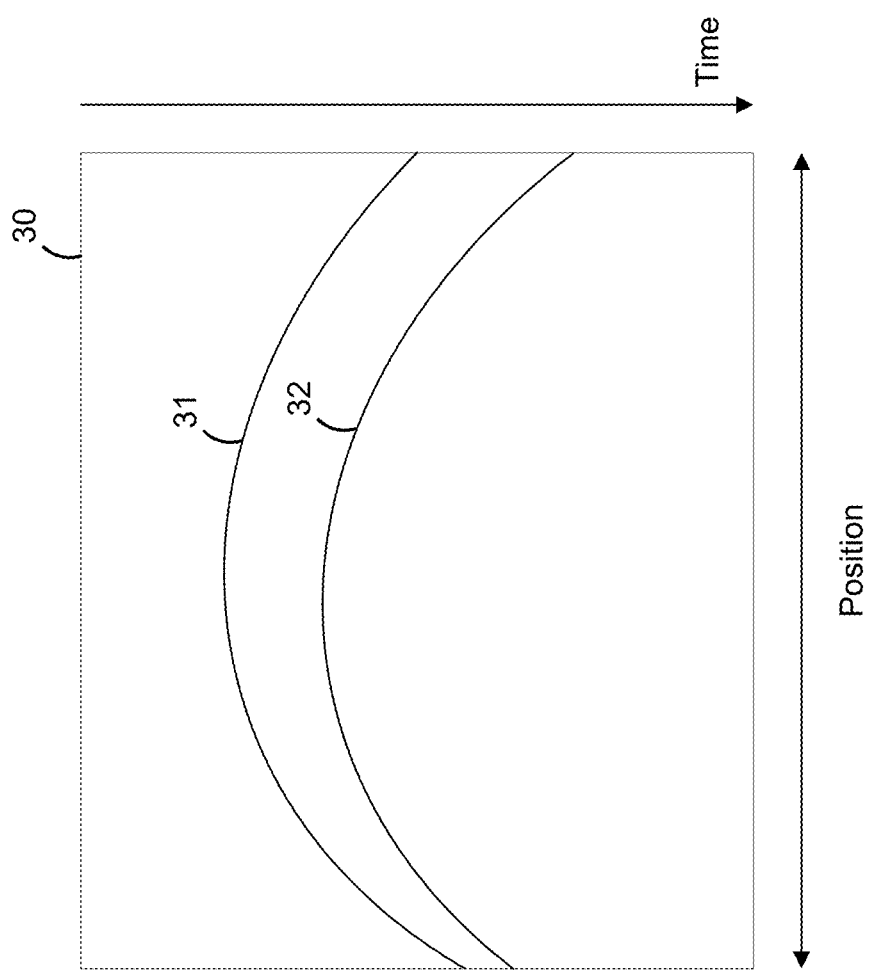
FIG. 2 is an exemplary image generated by the streak tube system of FIG. 1.

An example of a streak tube imaging lidar image 30 produced by the imaging optical element 21 is illustrated in FIG. 2. In this example, a body of shallow water is illuminated from an aircraft with a laser beam that was widely divergent to match the field of view of the slit aperture optics 17 for the streak tube photocathode 14. The water surface appears as a curved line 31 in the image 30 whereas the bottom of the body of water appears as a curved line 32 as the laser returns are farther away and are in flight longer than the returns from the surface of the water. The curvature in the curved lines 31 and 32 is due to the fact that the distance to the water surface is nearest along a directly down looking path. Thus, returns from other locations of the surface and bottom are and appear farther away.

It should be noted that the embodiments herein are not intended to be limited to just lidar. Rather, the streak tube embodiments herein may be used in a variety light imaging processes.

Figure 3:
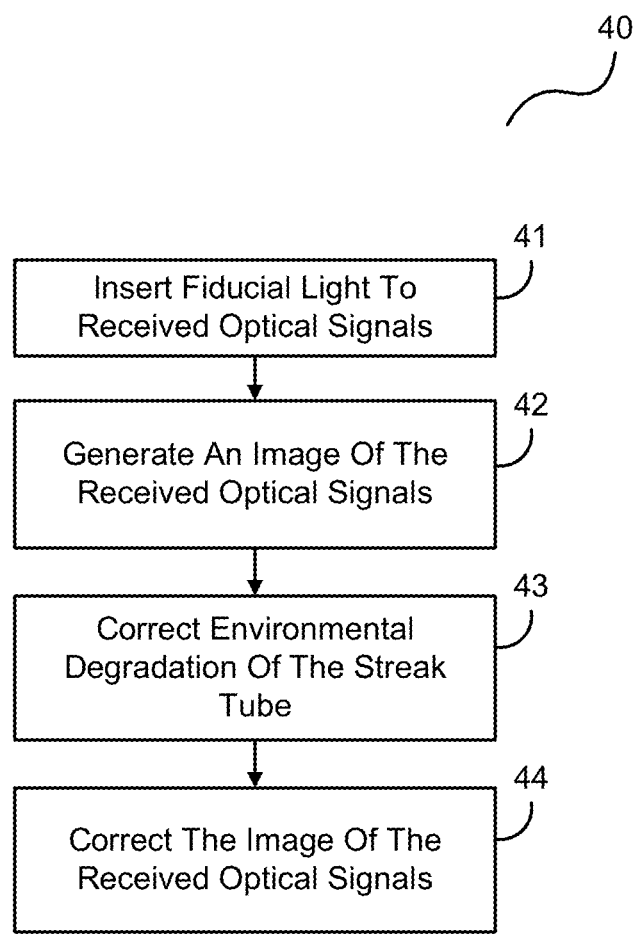
FIG. 3 is a flowchart of an exemplary process of a streak tube system.

FIG. 3 is a flowchart of an exemplary process 40 for calibrating the streak tube system 10. In this embodiment, the process 40 initiates when the streak tube system 10 begins receiving the optical signal(s) 16. As the optical signal 16 is being received, fiducial light 23 is inserted into the optical signal 16, in the process element 41. Generally, the fiducial light is inserted asynchronously to the received optical signal 16. The optical signal 16 and the fiducial light 23 pass through the streak tube 11 where they are ultimately recorded by the optical imaging element 21 from which an image may be generated, in the process element 42.

As mentioned, certain environmental conditions can degrade/distort the streak tube 11, leading to an inaccurate representation of the optical signal 16 in the image generated by the optical imaging element 21. The fiducial light 23, by having known qualities and attributes (e.g., return distance, wavelength, and the like), is used to correct the environmental degradation of the streak tube 11, in the process element 43. For example, in a lidar embodiment, the environmental degradation of the streak tube 11 can distort the lidar image 30 of FIG. 2 thereby causing inaccurate distances between the curved line 31 of the water surface and the curved line 32 of the bottom of the body of water. By using fiducial light 23 with known attributes, the environmental degradation of the streak tube 11 can be accounted for such that the image of the received optical signals can be corrected, in the process element 44.

To illustrate this correction process, a transformation between a pixel x-y location and a time-receive angle location of the signal is used. This transformation can be represented as follows:

$$\begin{bmatrix} \varphi \\ t \end{bmatrix} = H(P_x, P_y), \quad \text{Eq. 1)}$$

where $\varphi$ is angle, t is time, and $P_x$ and $P_y$ are the pixel coordinates. Generally, this angle coordinate is applicable to a "push broom" lidar configuration. However, those skilled in the art should readily recognize that a spatial location along the slit could be used for general streak tube system applications. If there is no geometric distortion, then this relationship can be represented as:

Eq. 2) $\varphi = A \cdot P_x$ and $t = B \cdot P_y$, where A is the degrees per pixel (e.g. 0.0586°/pixel) and B is the sweep speed in seconds per pixel. In some embodiments, an offset is used to obtain an absolution time and spatial location. As such, a constant C may be added such that $t = B \cdot P_y + C$.

However, nonlinearities in the sweep of the streak tube 11 and complexities in electron propagation physics and changes from environmental degradation results in geometric distortion, which depart from this rectilinear mapping. It is these geometric distortions that are captured through the geometric calibration provided by the embodiments herein. In one embodiment, the streak tube 11 may be calibrated by representing mappings from pixel position to time and space with fitting functions (e.g., through polynomials having cross terms in time and space). Alternatively or additionally, the mappings could be implemented using a look up table.

Figure 4:
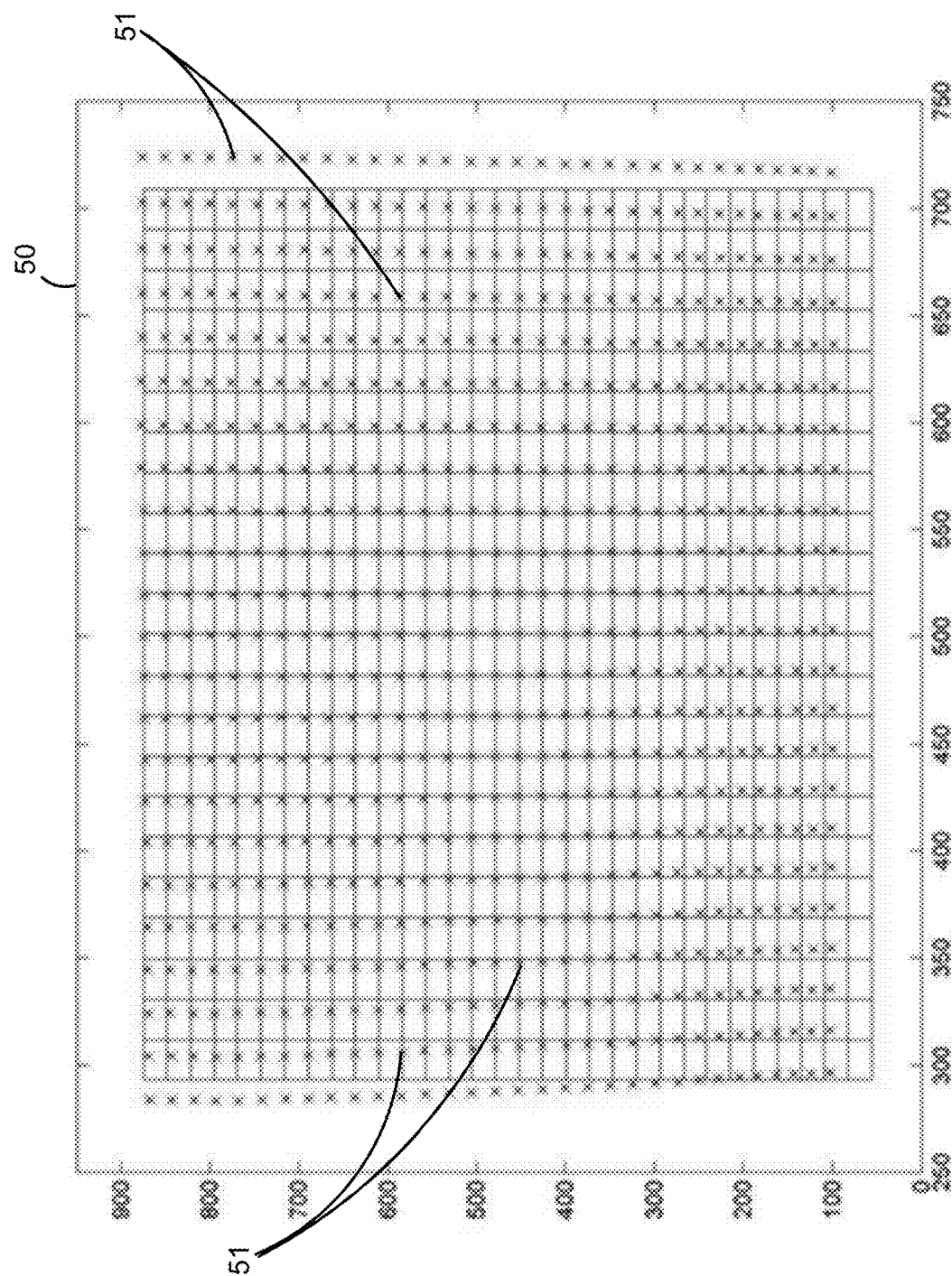
FIG. 4 is an exemplary deformation grid used to calibrate a streak tube.

In one embodiment, a laser on a translation stage is used to illuminate locations along a slit array (e.g., via the slit aperture optics 17) with successive time delays, so that a "deformation grid" of actual time delays and horizontal positions can be measured. For example, geometric distortions lead to a deformation of the grid on the image plane is illustrated in FIG. 4. The x-patterns 51 correspond to the image locations of an image 50 from the optical imaging element 21 based on fiducial images (e.g., from lidar targets) spaced equally in time and space. As can be seen in the figure, the x-patterns 51 do not form a perfect, equally spaced rectilinear grid, at the optical imaging element 21. This is due to the environmental degradation of the streak tube 11. So, a geometric calibration is performed. It should be noted that the fiducial image separation in the horizontal direction (e.g., space) depends on the on the time delay (e.g., vertically in the image 50) and the time scale.

Generally, empirically derived coefficients for a calibration mapping of the streak tube 11 is determined during laboratory testing and applied to the streak tube system 10 during subsequent data collection. In a laboratory setting, the environment and collection configuration can be tightly controlled and thus the geometric mapping and calibrations remain relatively stable. However, in a STIL, the streak tube may be deployed from agile platforms and/or in changing environmental conditions the drive changes in the calibrations resulting in substantial errors in STIL measurements. Additionally, the orientation of the STIL can cause geometric distortion. The earth's magnetic field can also make a substantial impact on the geometric distortion in the streak tube 11. Thus, calibration measurements taken in the laboratory or in one specific orientation only provide partial correction, particularly when the streak tube system 10 is operated in a different orientation or location where the relative magnetic field strength and orientation has changed.

To illustrate, laser pulses in one embodiment were delivered through a 100 m fiber, split into three fibers, and mounted to the front of a fiber taper coupling light to the slit aperture optics 17. The spatial and temporal location light pulses through the STIL were controlled and used as a reference (e.g., fiducials). For example, an object placed in the field of view of the STIL at a known distance may be used as a point of reference. Then, STIL returns can be used as fiducial signals that can be used to calibrate the streak tube 11.

Figure 5:
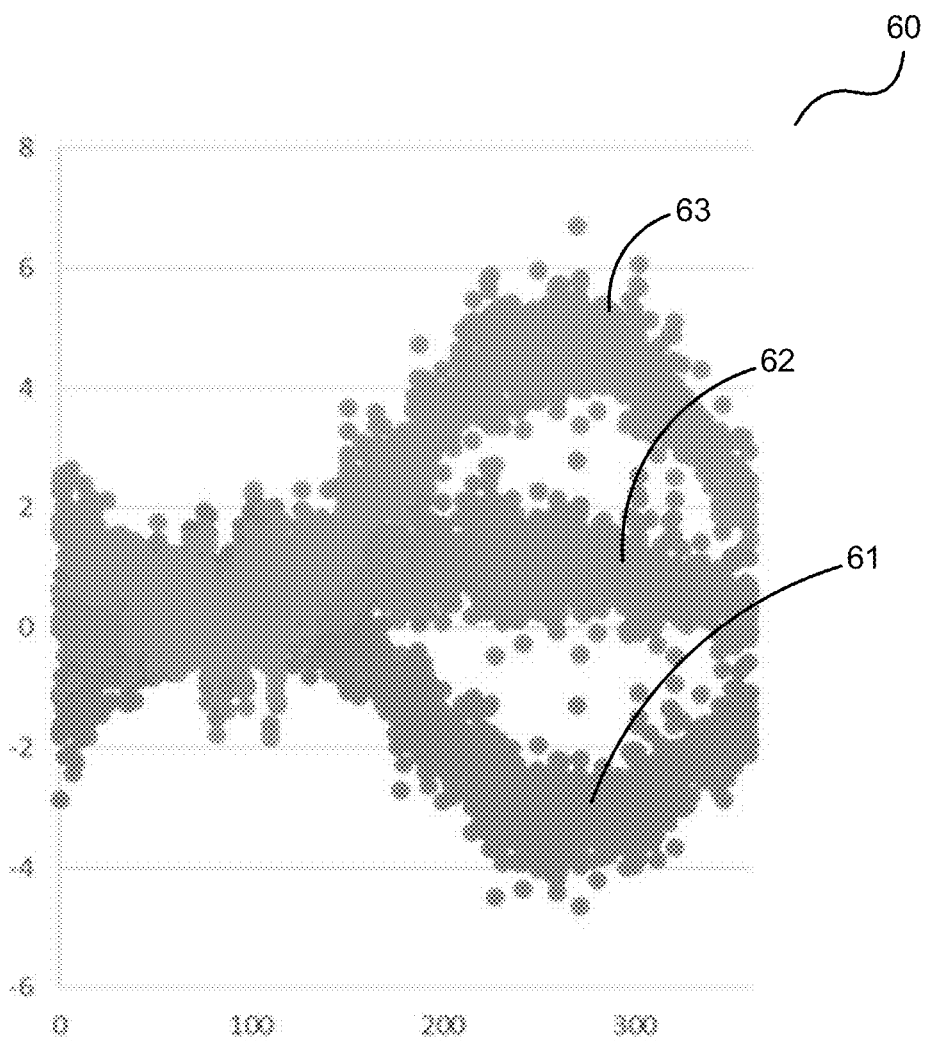
FIGS. 5-7 illustrate exemplary displacements caused by an uncalibrated streak tube.
Figure 6:
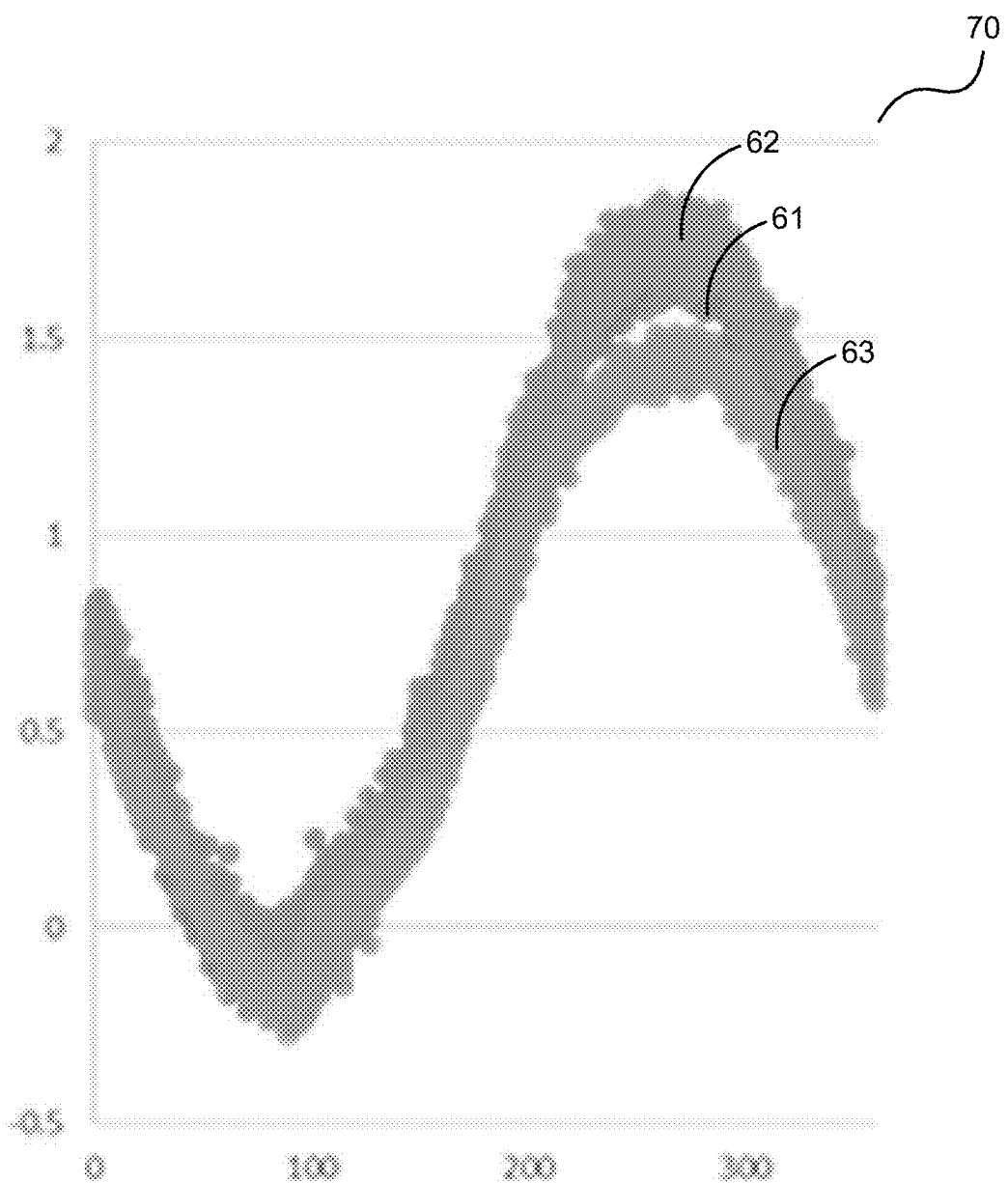

In one embodiment, the STIL was mounted onto a table capable of rotating 360 degrees. The time between the streak tube 11 trigger and the laser pulse are set to a constant relative delay and measurements of spot images are collected as fiducials while rotating the table mount. In FIG. 5, the plot 60 illustrates that the spatially-distributed fiducial images provide relative displacements of each of the fiducials 61, 62, and 63 (e.g., in pixels) as a function of the table angle relative to magnetic North of the earth. In this case, the vertical (or temporal) pixel movement of collected fiducials away from the center of a resultant image, such as the image 30 of FIG. 3, were in opposite directions with an error amplitude of approximately 5 pixels. Smaller errors are observed for fiducials at the center of the image. The fiducial locations also had a horizontal (or angle) pixel error as a function of table orientation (see e.g., the plot 70 of FIG. 6).

Figure 7:
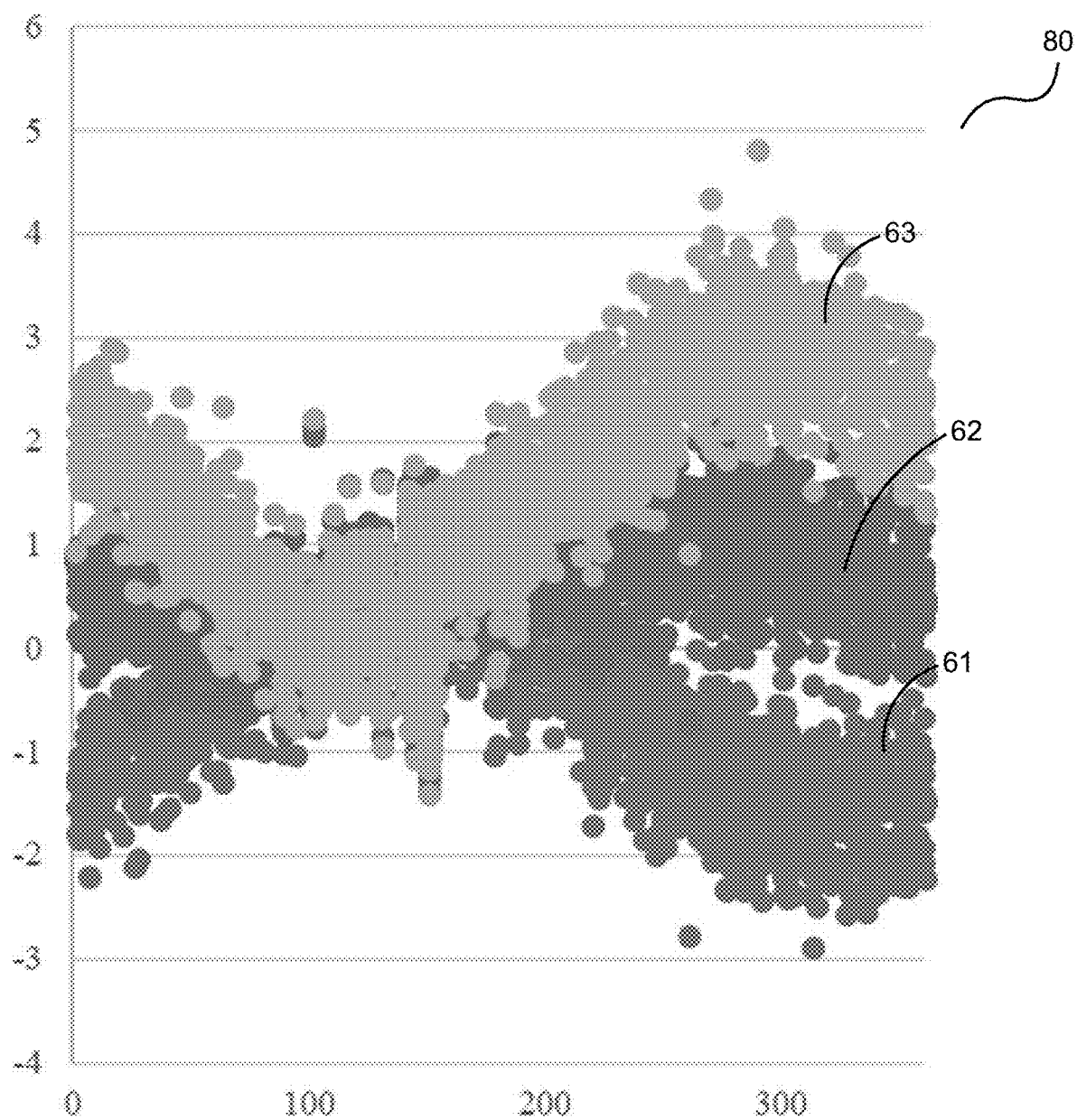

These measurements are repeated covering the STIL with a mu-metal magnetic shield to counter the magnetic North of the earth. A plot 80 of the relative vertical (or temporal) displacement of as a function of angle is shown in FIG. 7. Here, the displacement of each fiducial 61-63 was reduced relative to the initial unshielded test (e.g., reduced between roughly 3.5 and −2 pixels in FIG. 7 from between roughly 5.5 and −4 pixels in FIG. 5). This signature of the reduced geometric changes after shielding is consistent with repeated laboratory tests that indicate that streak tube geometric deformations are dependent on orientation and are thus dependent on external magnetic fields. However, variations in geometric mapping still exist with the magnetic shielding.

Figure 8:
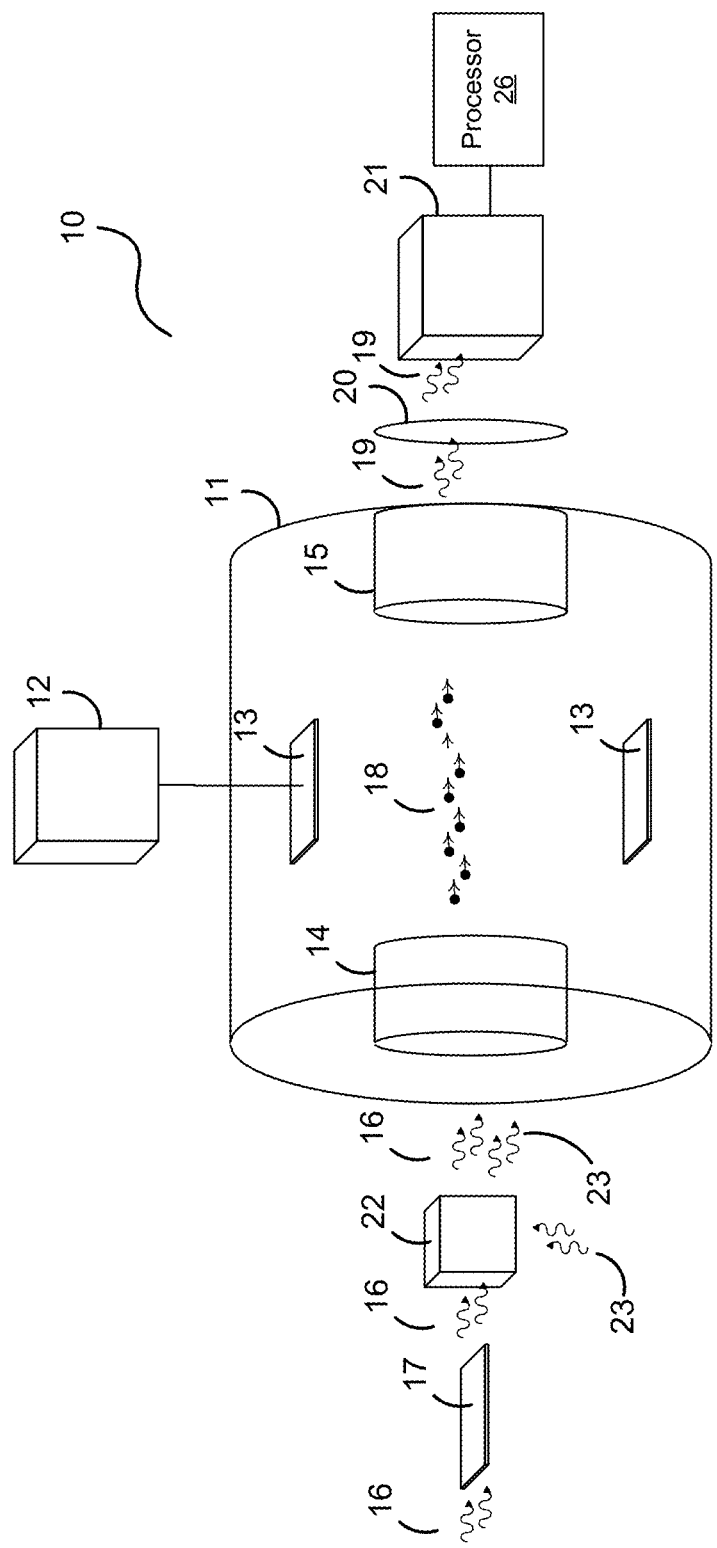
FIG. 8 is a block diagram of another exemplary streak tube system for imaging light.

To manage the effects of external magnetic fields, as well as other calibration drifts, a dynamic streak tube deformation correction system is provided. In one embodiment shown in FIG. 8, the streak tube system 10 includes integrated hardware (e.g., injection optics 23 and the processor 26) to provide calibration at any time during operation or even when off line. This dynamic calibration system provides for correction for magnetic field fluctuations as well as optical distortions that may result from thermo-mechanical distortions of certain optical components of the streak tube system 10 and/or drifts in electrical response that affect the electron beam propagation or sweep within the streak tube 11.

The injection optics 22 permit optical acceptance of both the externally received optical signals 16 and the calibration fiducial signals 23 within a superimposed signal that is received by the streak tube 10 which then produces a streak image on the phosphor screen 15. In this embodiment, the imaging optical element 21 is implemented as a camera.

Figure 9:
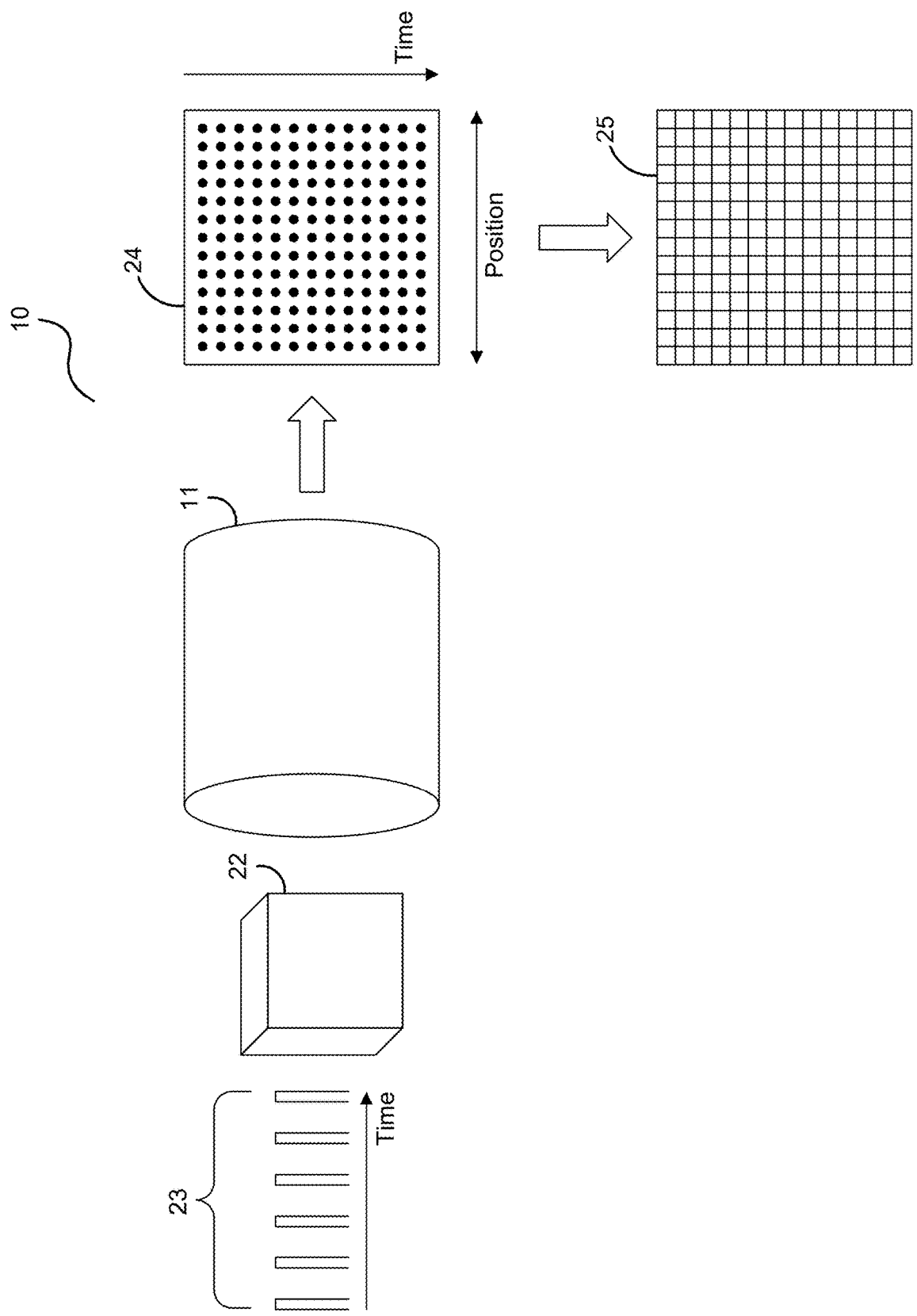
FIG. 9 is a flow diagram for introducing fiducial signals for calibrating the streak tube.

The injection optics 22 and the fiducial signal(s) 23 permit dynamic calibration while the streak tube system 10 is in operation. The fiducial signals 23 may be provided occasionally or continuously. For example, as illustrated in FIG. 9, pulsed optical signals 23 are injected into one or more positions at the streak tube slit aperture optics 17. The image that is produced by the streak tube 11 includes an array of image spots 24 corresponding to fixed horizontal separations and time separations corresponding to the optical pulse separations, from which a rectilinear correction grid 25 can be generated.

Figure 10:
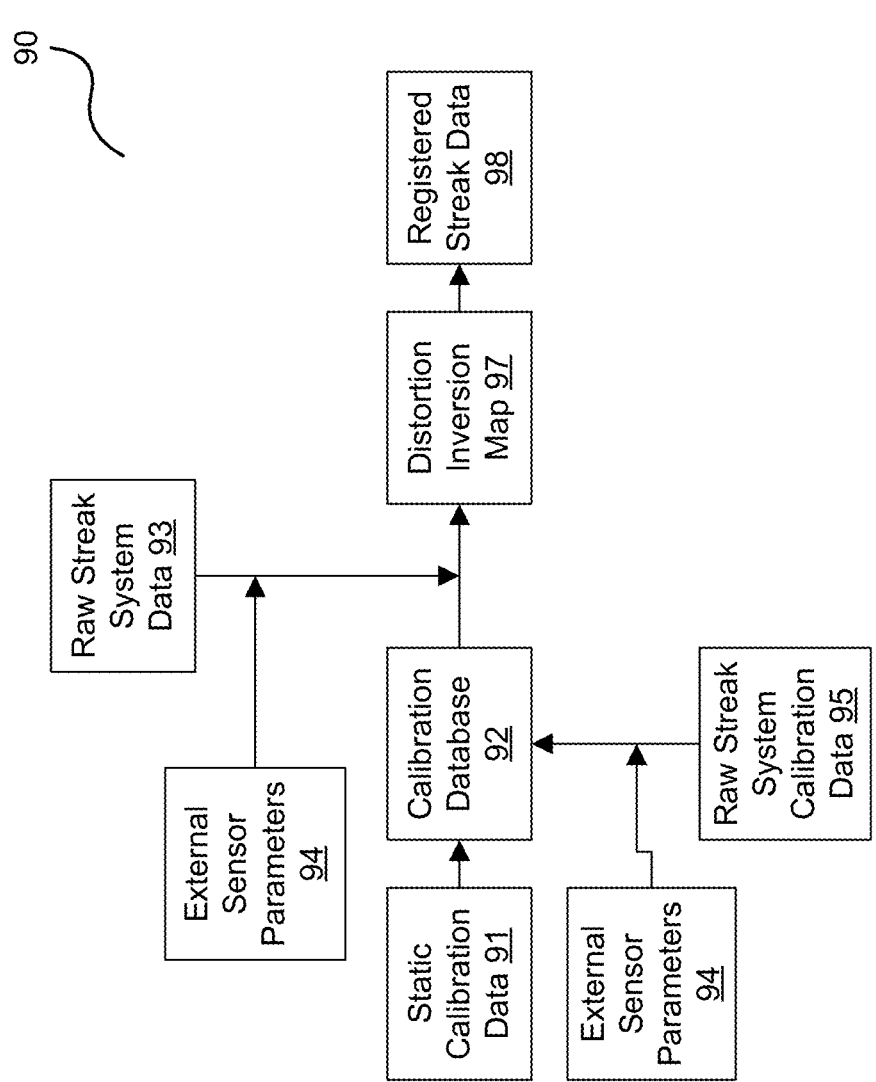
FIG. 10 is a functional block diagram of an exemplary calibration system.

FIG. 10 is a block diagram of the dynamic streak tube calibration system 90 operable with the streak tube system 10. In this embodiment, several of the elements of the streak tube calibration system 90 are functional elements that may be operable with the processor 26 (e.g., as software components, hardware components, firmware components, or combinations thereof). For example, the processor 26 may implement a calibration database 92 that stores and maintains a plurality of data types, such as raw streak system calibration data 95 from the "live" fiducial signals 23 being received. Other data types may include various forms of external sensor parameters 94 (e.g., angular motion of a rotating platform, temperature, etc.), and static calibration data 91 (e.g., laboratory derived calibration results mentioned above). The processor 26 may use this data while the streak tube system 11 is in operation and receiving raw streak system data 93 (e.g., live optical signals 16). Alternatively or additionally, the processor 26 may use this data during post processing.

From there, the processor 26 may generate a distortion inversion map 97. For example, the processor 26 may generate a grid from the image spots formed by the fiducial signals 23. As the streak tube 11 is subject to distortion from environmental degradation, the processor 26 may use the known qualities of the fiducial signals 23 to correct the grid, such that it forms a more exact rectilinear grid as that shown in rectilinear grid 25 of FIG. 9. This rectilinear grid operates as the distortion inversion map 97 to remap pixels of the raw streak system data 93 generated by the imaging optical element 21. In other words, the processor 26 registers raw streak data associated with the collected optical signals 16 by correlating the data to a time delay and imaging position or angle of the streak tube system 11. Then, the processor 26 maps pixels associated with raw streak system data 93 to the distortion inversion map 97. The processor 26 then uses the distortion inversion map to remap the pixels to their correct locations (process element 98).

In one embodiment, the distortion inversion map 97 is represented as a polynomial that the processor 26 processes to remap the pixels in the generated image. For example, the mapping from pixel positions to azimuth and elevation may be estimated by using a polynomial with fitted coefficients. For one calibrated system, the pixel coordinates ($P_x$, $P_y$) (horizontal and vertical pixel positions) are mapped to range and azimuth through the following polynomials.

$$\text{Range} = (B_{y,1} + B_{y,2}P_y + B_{y,3}P_y^2) + (B_{x,1} + B_{x,2}P_x + B_{x,3}P_x^2 + B_{x,4}P_x^3) \quad \text{Eq. 3)}$$

$$\text{Azimuth} = (C_{x,1} + C_{x,2}P_x + C_{x,3}P_x^2 + C_{x,4}P_x^4) + (C_{y,1} + C_{y,2}P_y) \quad \text{Eq. 4)}$$

| X-Range Dependence | | Y-Range Dependence | | X-Az Dependence | | Y-Az Dependence | |
|---|---|---|---|---|---|---|---|
| $B_{x,1}$ | 1.51664 | $B_{y,1}$ | −7.07109e−01 | $C_{x,1}$ | −2.63103e+01 | $C_{y,1}$ | 1.39216e−01 |
| $B_{x,2}$ | −9.11227e−03 | $B_{y,2}$ | 1.51058e−01 | $C_{x,2}$ | 4.86700e−02 | $C_{y,2}$ | −4.65675e−04 |
| $B_{x,3}$ | 9.62711e−06 | $B_{y,3}$ | −6.45332e−06 | $C_{x,3}$ | 2.72012e−05 | | |
| $B_{x,4}$ | 5.30593e−10 | | | $C_{x,4}$ | −1.97083e−08 | | |

While a polynomial fitting is one way to represent the distortion inversion map 97, other fitting functions are possible, including look up tables and/or trigonometric functions. Regardless, a sequence of stored numerical coefficients may be stored in the calibration database 92 to convert camera pixel locations to range and azimuth.

In some embodiments, the streak tube system 10 may undergo an initial static calibration to produce a static distortion map, which is then updated or modified during subsequent dynamic calibrations. For example, under static conditions, static test data streamed from targets corresponding to known angular and delay parameters is analyzed and compared to data obtained with calibrated delay sequence resulting from fiducial signals 23 to produce a static distortion map. The static distortion map may be stored as polynomial coefficients as previously discussed. The static distortion map corrects for sources of distortion in that static test configuration, including opto-mechanical and thermal distortions. In general, multiple static calibrations may be produced over a range of conditions (e.g., parameters such as ambient temperature and pressure) so that a static distortion map can be provided as a function of such parameters during dynamic operation.

Figure 11:
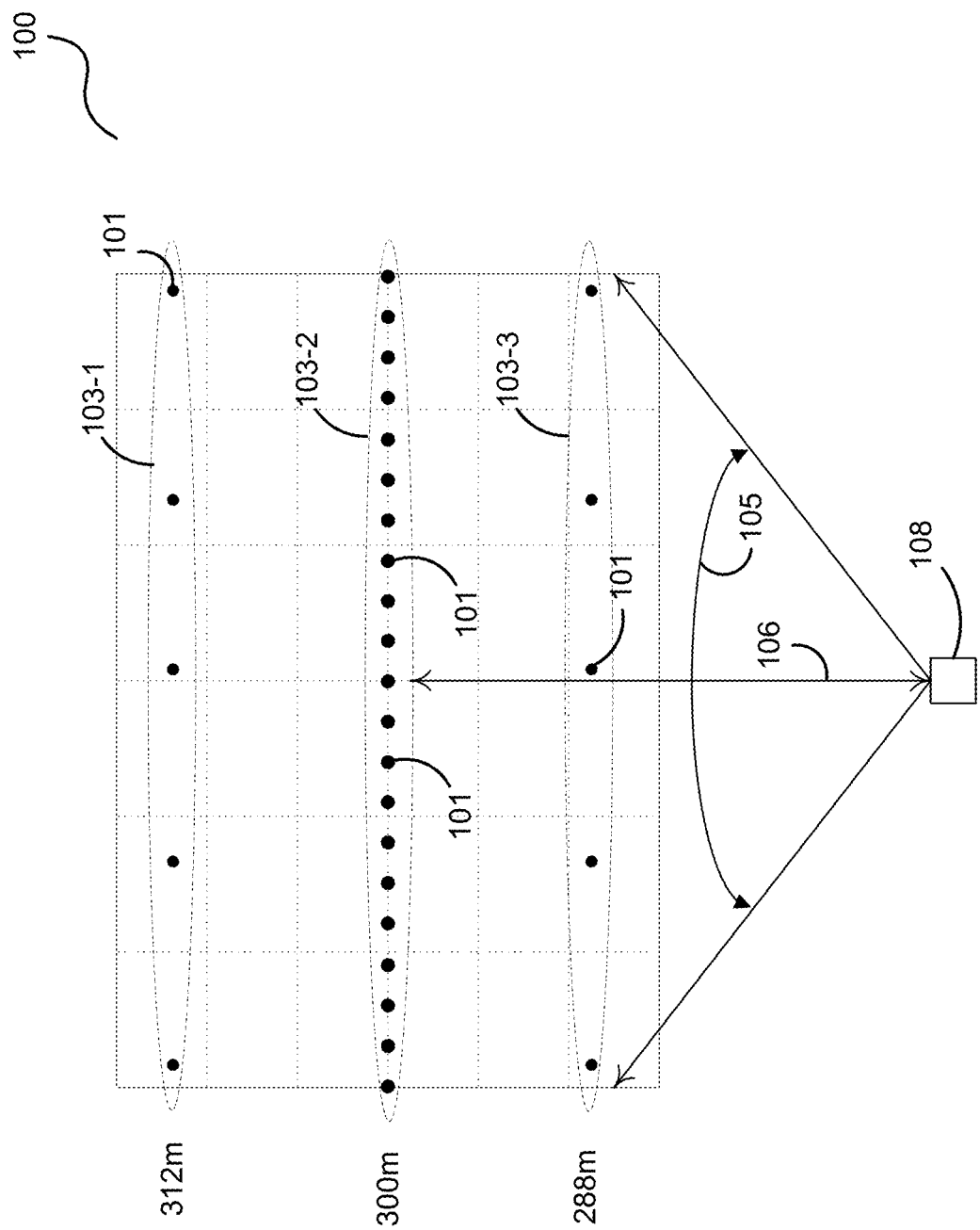
FIG. 11 is a depiction of an exemplary scene with fiducial targets.

FIG. 11 illustrates the use of fiducial objects at known locations that, when illuminated by a lidar (e.g., the STIL embodiments) backscatter or reflect the fiducial signals 23 to the streak tube 11. In this embodiment, a STIL sensor is positioned to view an array of target poles 101 in a scene 100 that are used to produce the fiducial signals 23 (e.g., STIL returns from the poles 101). The poles 101 are precisely placed in three rows 103-1-103-3 in the field of view 105 of the STIL sensor. The 21 fiducials at the 300 m range 106 (e.g., the row 103-2) are separated horizontally by 15 m. The rows of fiducials with much larger separation were also placed 312 m (e.g., the row 103-1) and at 288 m (e.g., the row 103-1).

Figure 12:
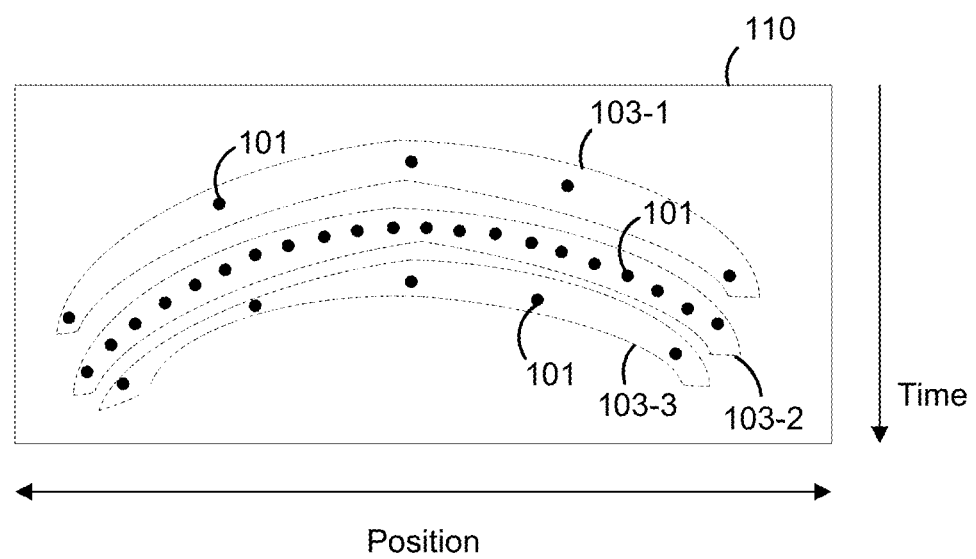
FIG. 12 is a depiction of an exemplary image of the scene of FIG. 11.
Figure 13:
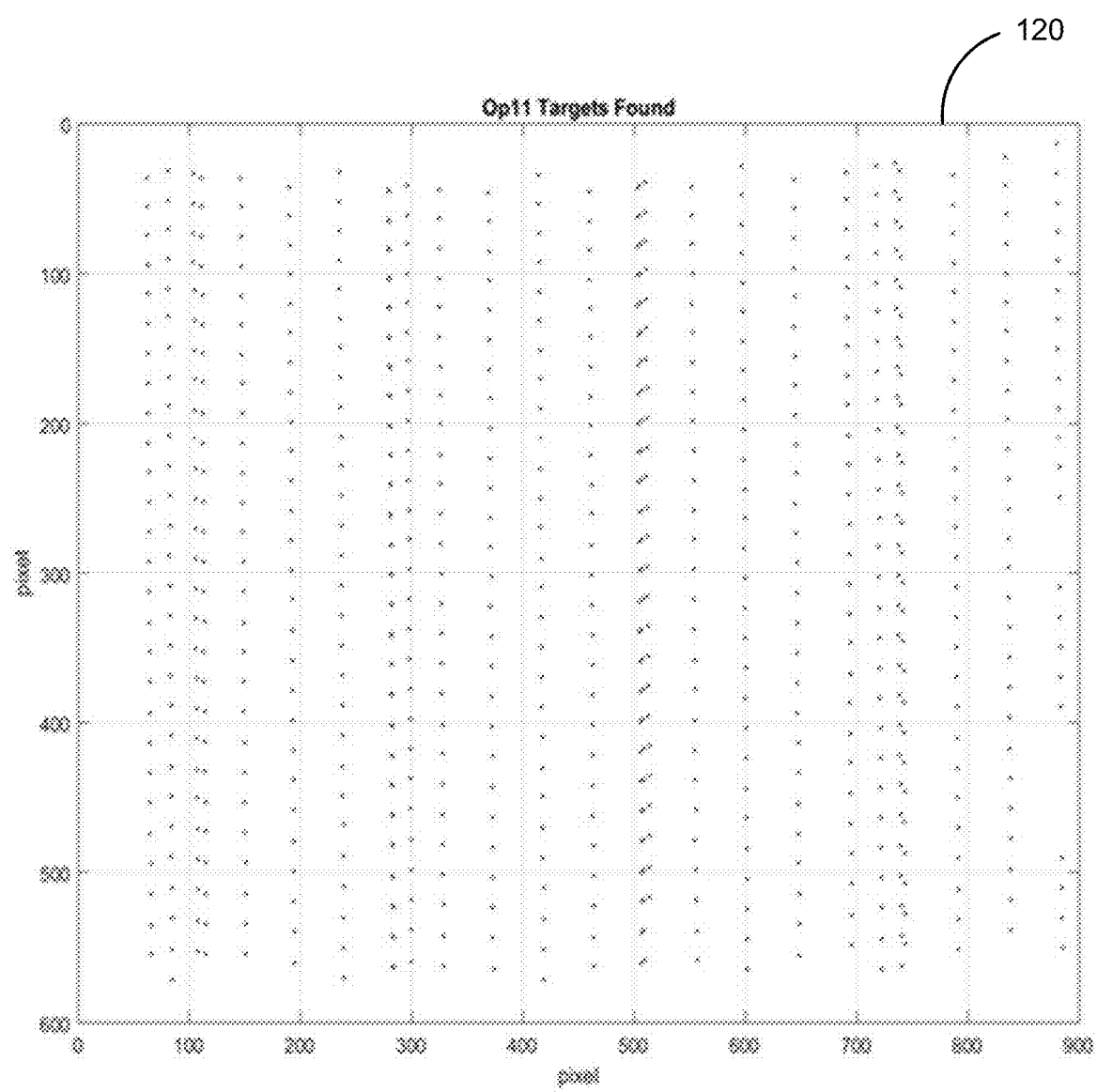
FIG. 13 illustrates accumulated target pixel coordinates.

FIG. 12 illustrates an image 110 comprising the fiducials generated by the imaging optical element 21. By introducing known time delays between the transmitted laser pulse and the trigger for the imaging optical element 21, the calibration grid can be swept in a vertical pixel direction (e.g., with respect to time) for subsequent images in the static data stream. FIG. 13 illustrates accumulated target pixel coordinates 120 that are identified during a sequence of images and time delays. Since the physical and temporal offset of each target 101 is precisely measured, as well as the sensor position, the full distortion in the streak tube image can be measured. And, from that, the distortion inversion map 97 can be generated with lines having constant time delays and with lines having constant angular positions relative to the STIL. Regardless of the method of calculation, associating each of the target image positions with a known target position relative to the streak tube system 10 leads to a relatively precise mapping of the pixel position of an image of that target to an angle and delay.

During dynamic operation of the streak tube system 10, streak tube geometric mapping may drift due to ambient magnetic field changes, thermal changes, pressure changes, etc. This dynamic calibration process is used to provide updated temporal and angular mappings for streak tube data stream that includes both dynamic drift in the streak tube geometric mapping and static distortion sources.

In one embodiment, a static distortion map is applied to the data stream during dynamic operation, so that each pixel in the image from the streak tube 11 of a scene is associated with a range (time delay) and angle. During dynamic operation with the fiducial signals 23 being applied, centroids of the resulting image spots are determined, and displacements of the spots relative to the spots obtained during static testing are calculated. These displacements are identified as dynamic distortion corrections and are used to further correct the streak tube system 10 beyond the initial static correction.

The injection optics 22 for injecting the fiducial signals 23 may be implemented in a number of different ways as a matter of design choice. For example, in FIG. 14, the injection optics 22 employs a beam combiner 132 that combines the fiducials signal 23 and the external optical signal 16. The beam combiner 132 images the combined signal onto the slit aperture optics 17. In this embodiment, the slit aperture optics 17 may be a tapered fiber coupler that transmits light to a slit entrance of the streak tube 11. And, the fiducial signal 23 is generated from a time varying light source 131 that is focused onto the beam combiner 132 from the optical element 130 (e.g., a lens). The external optical signal 16 is focused by the external signal optical element 133, so that after passing through the beam combiner 132, the external optical signal 16 is collected at the slit aperture optics 17 along with the time varying fiducial signal 23.

Figure 14:
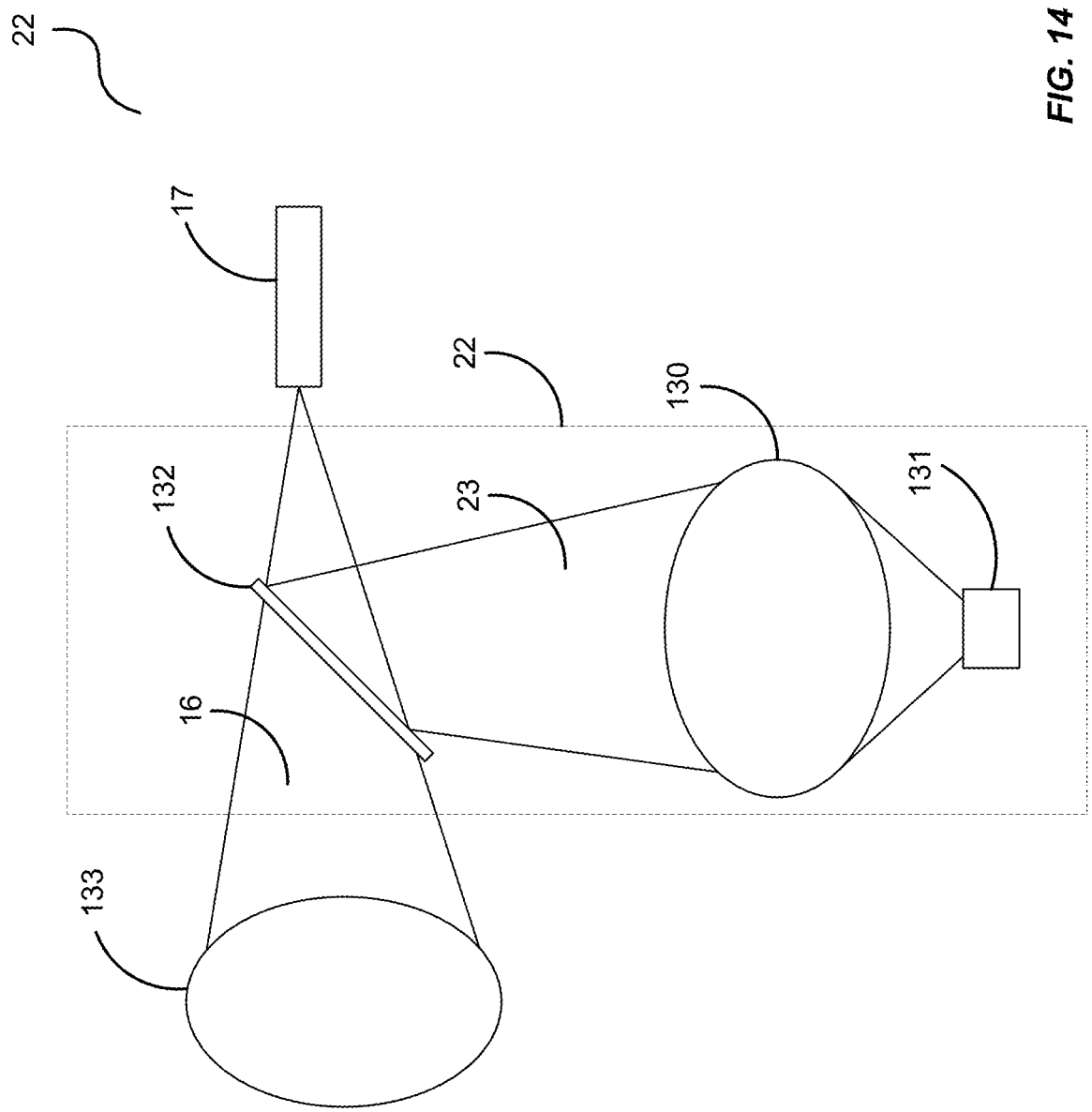
FIGS. 14-18 are block diagrams of exemplary insertion optics.
Figure 15:
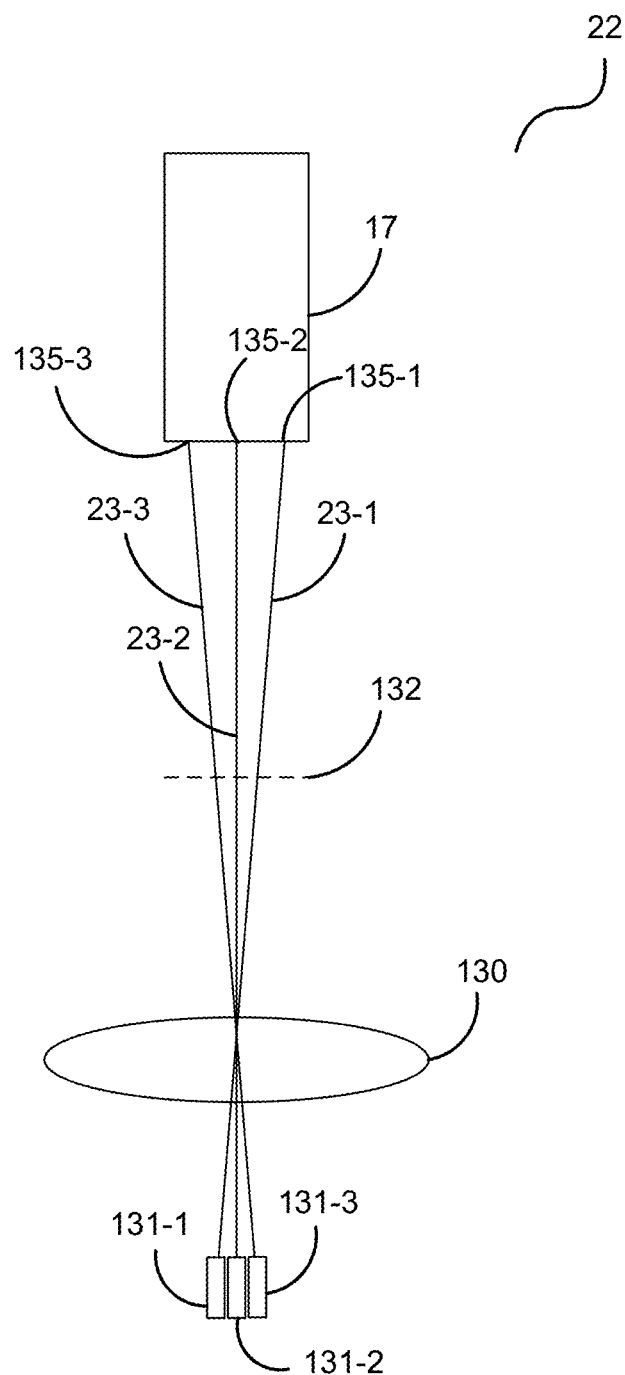

An orthogonal view of the injection optics 22 is shown "unfolded" in FIG. 15. Whereas FIG. 14 shows the side view of an array of fiducial time-varying light sources 131 (e.g., stacked into the page), the view in FIG. 15 shows an embodiment where three distinct light sources 131-1-131-3 are used as an array of fiducial time-varying light sources. The insertion optics 22 images each of the fiducial time-varying light sources 131 to distinct locations at the entrance of the slit aperture optics 17. This embodiment illustrates the chief rays of the fiducial signals 23-1-23-3 from each of the fiducial time-varying light sources 131-1-131-3 to their corresponding images 135-1-135-3 at the slit aperture optics. The beam combiner 132 in this embodiment is illustrated as the dashed line. It should be noted that the embodiments herein are not intended to be limited to any number or time of light sources 131.

While FIGS. 14 and 15 illustrate one general embodiment for beam combing as the means for implementing injection optics 22 for the fiducial signal 23, alternative embodiments may include the beam combining being operated using partial transmission and reflection, polarization, and/or spectral methods. For example, the beam combining insertion optic may be a thin film polarizer and the received external optical signal 16 may be polarized in a p-polarization relative to the insertion optics 22 such that the external optical signal 16 is transmitted through the thin film polarizer. The fiducial time varying light sources 131 may be polarized in the s-polarization to be reflected from the thin-film polarizer. In this arrangement, the fiducial time-varying light source 131 and external optical signal 16 may comprise the same spectral band such that a spectral bandpass filter placed at the slit aperture optics 17 can pass both signals.

In yet another embodiment, the fiducial time-varying light sources 131 radiate at a wavelength band that is different than the external optical signal 16. In this regard, beam combining may be implemented with a dichroic reflector designed to transmit the wavelength band of the external optical signal 16 and reflect the wavelength band of the fiducial signal 23. While these beam combining embodiments illustrate that fiducial optical signal 23 is reflected and the external optical signal 16 is transmitted, it should be clear to one skilled in the art that similar constructions may be formed where the external optical signal 16 is reflected and the fiducial signal 23 is transmitted.

Figure 16:
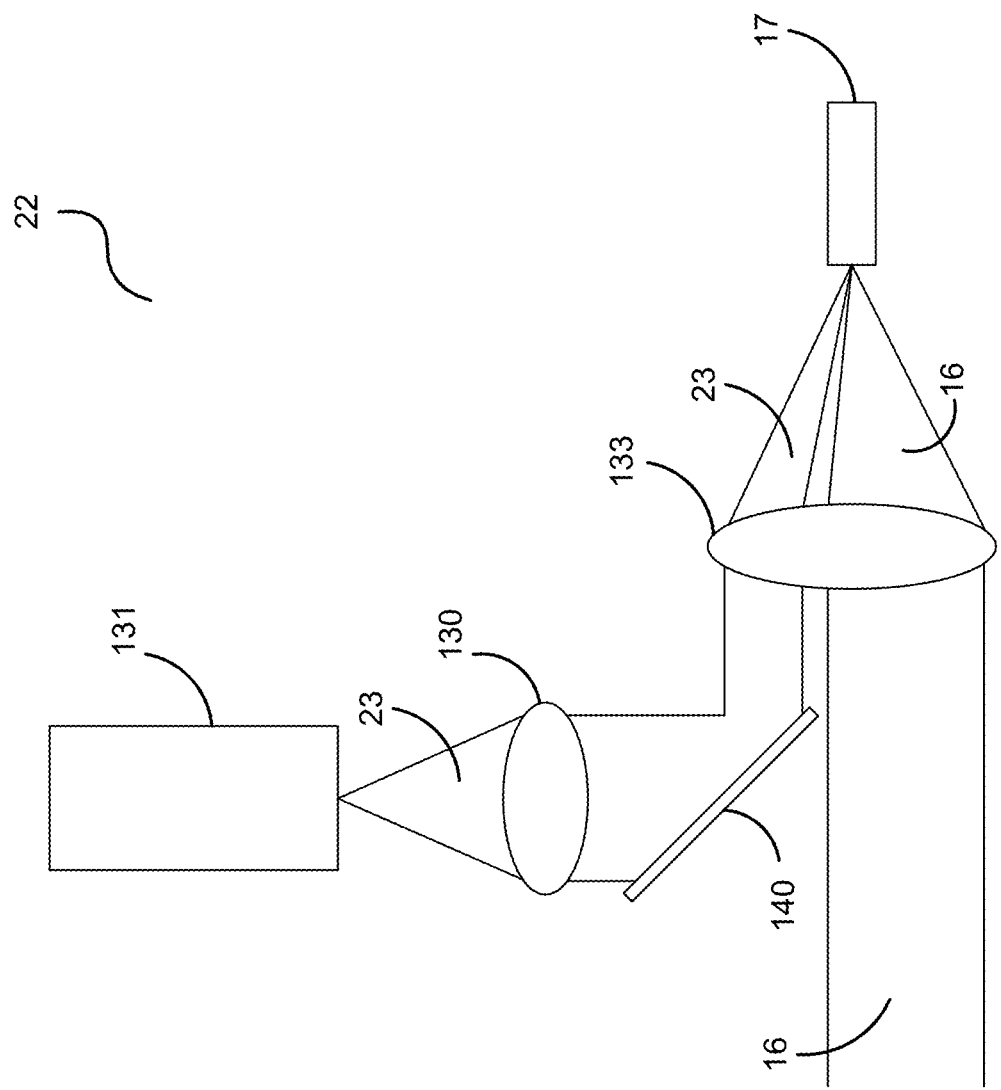

In another embodiment, the insertion optics may be constructed in an aperture sharing configuration as illustrated in FIG. 16. In such an embodiment, the external signal optics 133 may also function as insertion optics. In this regard, the fiducial optical signals 23 are collimated prior to injection into the "side" of the optics 133 such that the optics 133 collects light from both the fiducial optical signal 23 and the external optical signal 16, focusing both on the slit aperture optics 17. The fiducial signals 23 may be generated by one or more time varying light sources 131 which are then focused onto a reflector 140 via the optical element 130.

Figure 17:
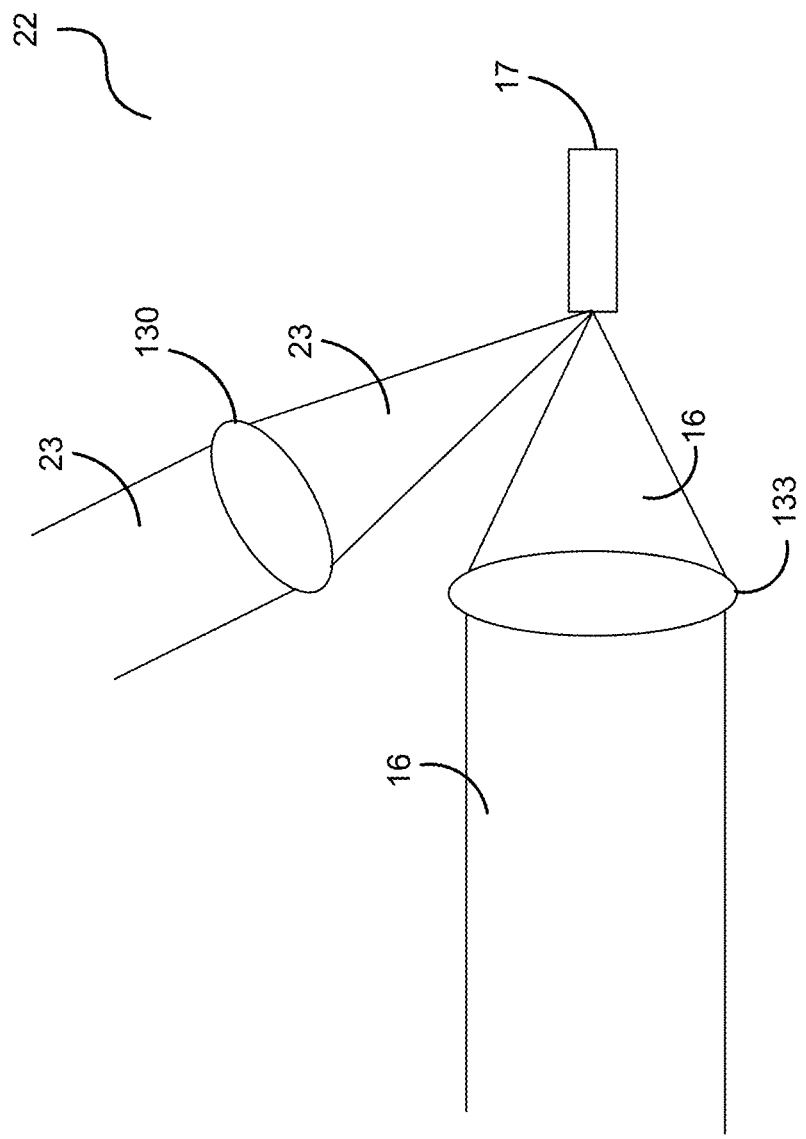

FIG. 17 illustrates another embodiment where the insertion optics 22 for the fiducial signal 23 are distinct from the external signal optics 133. The slit aperture optics 17, in this embodiment, is configured with an acceptance angle sufficient to permit the fiducial optical signals 23 to be focused (e.g., via the optical element 130) on to the slit aperture optics 17 from an angle outside of the external optical signal 16.

Figure 18:
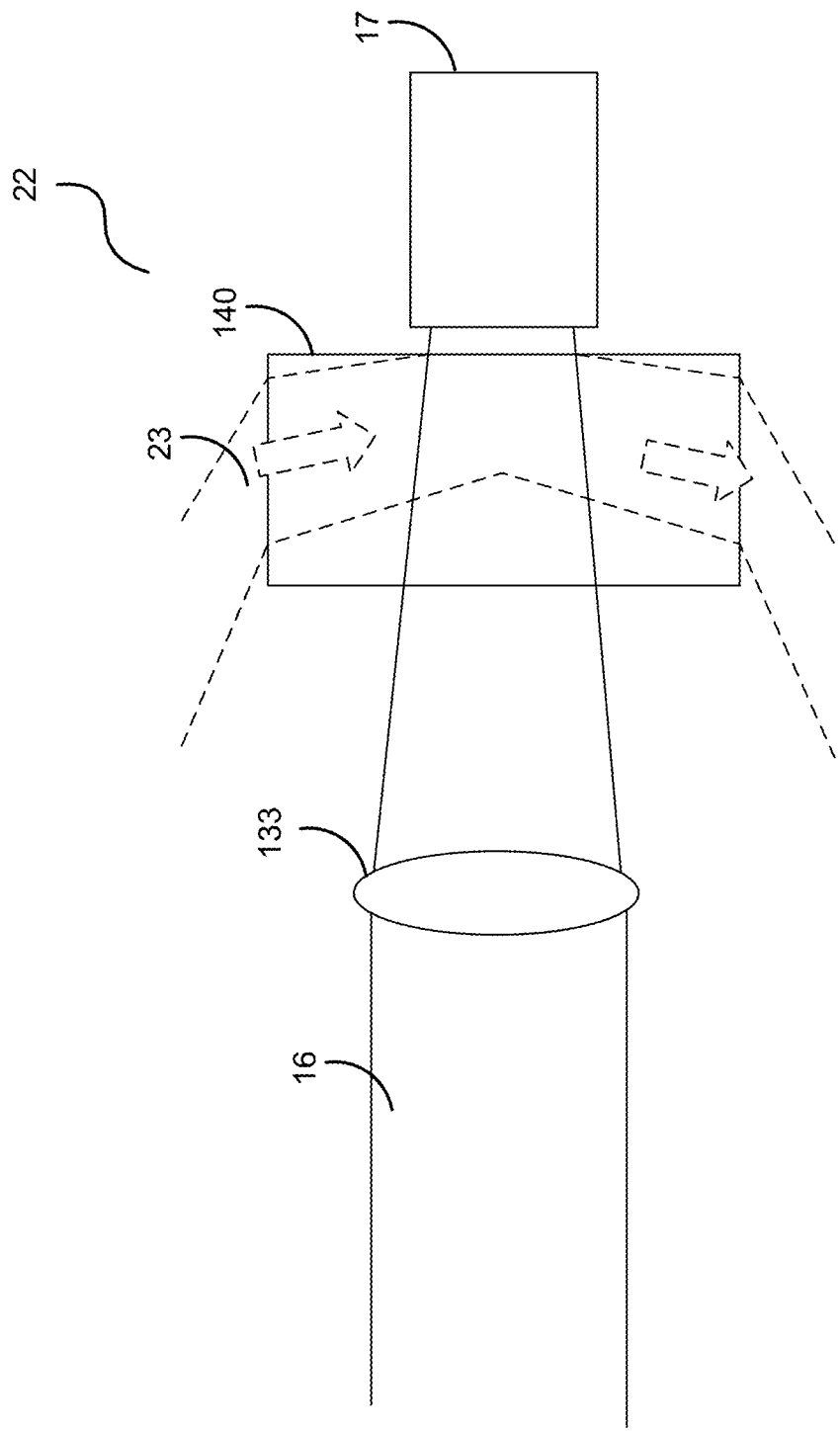

FIG. 18 illustrates another embodiment where the fiducial signals 23 may be inserted into slit aperture optics 17 using deflections within a total internal reflecting (TIR) surface 140. For example, a time varying fiducial signal 23 may be is injected into a material of the insertion optics 22 having an index of refraction at an angle such that the fiducial signal 23 will mostly reflect from a surface in close proximity to the slit aperture optics 17. Defects in the surface (e.g., scribed features) can result in a scattered transmission of the fiducial signal 23 which enters the slit aperture optics 17. Light from the external optical signal 16 is focused through the material of the insertion optics 22 such that most of the optical signal 16 impinging on the interface is incident at an angle less than the TIR limit.

It should be noted that the above embodiments are not intended to be limiting in scope. Rather, those skilled in the art should readily recognize that other embodiments may be used to combine fiducial signals 23 with external optical signals 16 (e.g., lidar returns) to propagate the combined signal through the streak tube 11 for calibration, either static or dynamic, of the streak tube system 10. For example, the fiducial signals 23 may be inserted via an attachment that is fastened to a fiber taper input aperture coupler to the streak tube 11.

It should also be noted that static calibration and fiducial data collection need not occur prior to the dynamic data collection, and that the application of dynamic calibrations need not be applied at the time of the dynamic data collection. The embodiments herein merely provided operational scenarios where calibration may be applied to data during post processing. However, the embodiments do not require sporadic collection of fiducial data during system operation.

In some embodiments, collection of data for dynamic calibrations may be triggered by sensors that sense a change in environmental conditions or passage in time (e.g. external magnetic field, temperature, atmospheric pressure, timer or clock, etc.). In additional embodiments, collected streak tube calibration parameters may be associated with simultaneous environmental measurements from additional sensors. When environmental measurements change, if previous calibration parameters were obtained under similar environmental conditions, the associated calibration parameters are used instead of collecting new dynamic calibrations. In further refined embodiments, interpolated calibrations parameters based on multiple previous calibrations may be used to provide a calibration best suited to measured environmental parameters. A timer or clock may also be used to enforce recalibration after time delays to minimize drifts in calibration over time.

Figure 19:
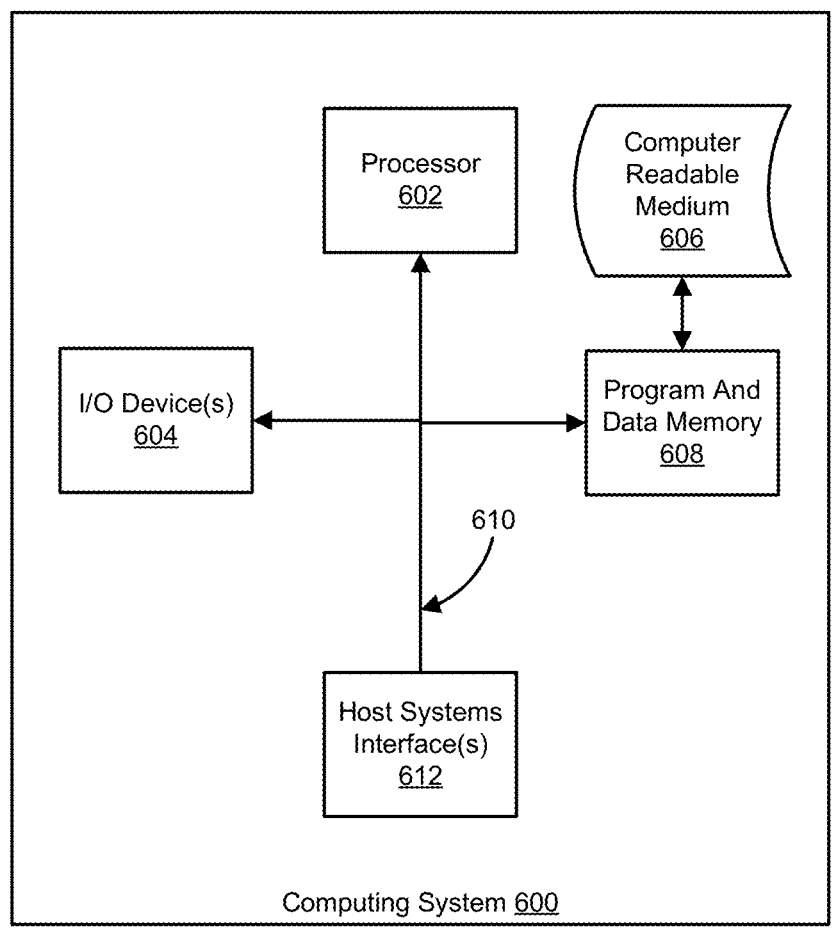
FIG. 19 is a block diagram of an exemplary processing system operable to implement portions of some embodiments herein.

The invention can also take the form of an entirely hardware embodiment, an entirely software embodiment or an embodiment containing both hardware and software elements. In one embodiment, the invention is implemented in software, which includes but is not limited to firmware, resident software, microcode, etc. FIG. 19 illustrates a computing system 600 in which a computer readable medium 606 may provide instructions for performing any of the methods disclosed herein.

Furthermore, the invention can take the form of a computer program product accessible from the computer readable medium 606 providing program code for use by or in connection with a computer or any instruction execution system. For the purposes of this description, the computer readable medium 606 can be any apparatus that can tangibly store the program for use by or in connection with the instruction execution system, apparatus, or device, including the computer system 600.

The medium 606 can be any tangible electronic, magnetic, optical, electromagnetic, infrared, or semiconductor system (or apparatus or device). Examples of a computer readable medium 606 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 600, suitable for storing and/or executing program code, can include one or more processors 602 coupled directly or indirectly to memory 608 through a system bus 610. The memory 608 can include local memory employed during actual execution of the program code, bulk storage, and cache memories which provide temporary storage of at least some program code in order to reduce the number of times code is retrieved from bulk storage during execution. Input/output or I/O devices 604 (including but not limited to keyboards, displays, pointing devices, etc.) can be coupled to the system either directly or through intervening I/O controllers. Network adapters may also be coupled to the system to enable the computing system 600 to become coupled to other data processing systems, such as through host systems interfaces 612, or remote printers or storage devices through intervening private or public networks. Modems, cable modem and Ethernet cards are just a few of the currently available types of network adapters.

What is claimed is:

1. An optical system, comprising:
    insertion optics for combining fiducial light with a received optical signal, the fiducial light having at least one predetermined attribute;
    a streak tube; and
    a processor operable to correct environmental degradation of the streak tube based on the at least one predetermined attribute of the fiducial light.

2. The optical system of claim 1, further comprising:
    slit aperture optics optically coupled to the streak tube and operable to receive the optical signal.

3. The optical system of claim 1, further comprising:
    an optical detector operable to image the received optical signal.

4. The optical system of claim 3, wherein:
the optical detector is an optical sensor array configured with an illumination position that is dependent upon a signal arrival time of the received optical signal.

5. The optical system of claim 1, wherein:
the processor is further operable to generate calibration parameters for the optical system based on the environmental degradation, and to store the calibration parameters with a data storage device for subsequent imaging of the received optical signal.

6. The optical system of claim 5, wherein:
the processor is further operable to dynamically update the calibration parameters based on the at least one predetermined attribute of the fiducial light.

7. The optical system of claim 1, wherein:
the environmental degradation comprises opto-mechanical distortion of the streak tube, a thermal distortion of the streak tube, the earth's magnetic field effect on the streak tube, or a combination thereof.

8. The optical system of claim 1, further comprising:
a sensor for measuring the environmental degradation of the streak tube,
wherein the processor is further operable to dynamically correct the environmental degradation based on the measured environmental degradation.

9. The optical system of claim 1, further comprising:
a lidar system operable to direct the lidar pulses to a target,
wherein the optical signal includes lidar pulse returns from the target.

10. The optical system of claim 1, wherein:
the processor is further operable to generate a distortion inversion map based on the at least one predetermined attribute of the fiducial light, and to correct an image of the received optical signal with the distortion inversion map.

11. A method for calibrating a streak tube, the method comprising:
combining fiducial light with a received optical signal, the fiducial light having at least one predetermined attribute; and
correcting environmental degradation of the streak tube based on the at least one attribute of the fiducial light to calibrate the streak tube.

12. The method of claim 11, further comprising:
receiving the optical signal via slit aperture optics optically coupled to the streak tube.

13. The method of claim 11, further comprising:
imaging the received optical signal with an optical detector.

14. The method of claim 13, wherein:
the optical detector is an optical sensor array configured with an illumination position that is dependent upon a signal arrival time of the received optical signal.

15. The method of claim 11, further comprising:
generating calibration parameters for the optical system based on the environmental degradation; and
storing the calibration parameters with the data storage device for subsequent imaging of the received optical signal.

16. The method of claim 15, further comprising:
dynamically updating the calibration parameters based on the at least one predetermined attribute of the fiducial light.

17. The method of claim 11, wherein:
the environmental degradation comprises opto-mechanical distortion of the streak tube, a thermal distortion of the streak tube, the earth's magnetic field effect on the streak tube, or a combination thereof.

18. The method of claim 11, further comprising:
measuring the environmental degradation of the streak tube; and
dynamically correcting the environmental degradation based on the measured environmental degradation.

19. The method of claim 11, wherein:
the optical signal includes lidar pulse returns from the target.

20. The method of claim 11, further comprising:
generating a distortion inversion map based on the at least one predetermined attribute of the fiducial light; and
correcting an image of the received optical signal with the distortion inversion map.

21. A non-transitory computer readable medium comprising instructions that, when executed by a processor, are operable to direct the processor to calibrate a streak tube by:
combining fiducial light with a received optical signal, the fiducial light having at least one predetermined attribute; and
correcting environmental degradation of the streak tube based on the at least one attribute of the fiducial light to calibrate the streak tube.

22. The computer readable medium of claim 21, wherein:
the optical signal is received via slit aperture optics optically coupled to the streak tube.

23. The computer readable medium of claim 21, further comprising instructions that direct the processor to:
image the received optical signal with an optical detector.

24. The computer readable medium of claim 23, wherein:
the optical detector is an optical sensor array configured with an illumination position that is dependent upon a signal arrival time of the received optical signal.

25. The computer readable medium of claim 21, further comprising instructions that direct the processor to:
generate calibration parameters for the optical system based on the environmental degradation; and
store the calibration parameters with a data storage device for subsequent imaging of the received optical signal.

26. The computer readable medium of claim 25, further comprising instructions that direct the processor to:
dynamically update the calibration parameters based on the at least one predetermined attribute of the fiducial light.

27. The computer readable medium of claim 21, wherein:
the environmental degradation comprises opto-mechanical distortion of the streak tube, a thermal distortion of the streak tube, the earth's magnetic field effect on the streak tube, or a combination thereof.

28. The computer readable medium of claim 21, further comprising instructions that direct the processor to:
measure the environmental degradation of the streak tube; and
dynamically correct the environmental degradation based on the measured environmental degradation.

29. The computer readable medium of claim 21, wherein:
the optical signal includes lidar pulse returns from the target.

30. The computer readable medium of claim 21, further comprising instructions that direct the processor to:
generate a distortion inversion map based on the at least one predetermined attribute of the fiducial light; and
correct an image of the received optical signal with the distortion inversion map.

* * * * *